United States Patent
Muller (10) Patent No.: US 6,498,934 B1
(45) Date of Patent: Dec. 24, 2002

(54) CHANNEL ALLOCATION USING ENHANCED PATHLOSS ESTIMATES

(75) Inventor: Walter Muller, Upplands Vasby (SE)

(73) Assignee: Telefonaktiebologet LM Ericsson (publ), Stockholm (SE)

(*) Notice: Subject to any disclaimer, the term of this patent is extended or adjusted under 35 U.S.C. 154(b) by 0 days.

(21) Appl. No.: 09/275,416

(22) Filed: Mar. 24, 1999

(51) Int. Cl.[7] ................................................. H04Q 7/20
(52) U.S. Cl. ........................ 455/450; 455/446; 455/452
(58) Field of Search ................................ 455/446, 447, 455/450, 452, 522, 67.6, 63

(56) References Cited

U.S. PATENT DOCUMENTS

| | | | |
|---|---|---|---|
| 5,056,109 A | * 10/1991 | Gilhousen et al. | ........... 455/522 |
| 5,095,500 A | 3/1992 | Tayloe et al. | |
| 5,148,548 A | 9/1992 | Meche et al. | |
| 5,295,138 A | 3/1994 | Greenberg et al. | |
| 5,491,837 A | 2/1996 | Haartsen | |
| 5,561,839 A | 10/1996 | Osterberg et al. | |
| 5,561,841 A | 10/1996 | Markus | |
| 5,596,570 A | 1/1997 | Soliman | |
| 5,828,962 A | 10/1998 | Ho-A-Chuck | |
| 6,137,991 A | * 10/2000 | Isaksson | ............ 455/67.1 |

FOREIGN PATENT DOCUMENTS

| | | |
|---|---|---|
| WO | WO9802010 | 1/1998 |
| WO | WO9827675 | 6/1998 |

OTHER PUBLICATIONS

Almgren M Et Al: "Slow Adaptive Channel Allocation For Automatic Frequency Planning"; International Conference On Universal Personal Communications, Sep. 29, 1996, pp. 260–264, XP002055382.

* cited by examiner

Primary Examiner—Vivian Chin
Assistant Examiner—James Moore
(74) Attorney, Agent, or Firm—Jenkens & Gilchrist, P.C.

(57) ABSTRACT

A method and apparatus for channel allocation using pathloss estimates. Pathloss values between mobile stations located in one cell and base stations located in surrounding cells are calculated. Using the calculated pathloss values the system can determine the amount of interference which will be caused to transmissions in the surrounding base stations by allocating a certain channel to a base station located in the one cell. The system also can determine the source of the interference and use such a determination in the allocation of channels.

13 Claims, 7 Drawing Sheets

| | MOBILE STATION | BASE STATION 1 350 | BASE STATION 2 340 | BASE STATION 3 360 |
|---|---|---|---|---|
| MS TRANSMITTED OUTPUT POWER | $MS_{TransBS1}$ AT T1 | | $MS_{TransBS2}$ | $MS_{TransBS3}$ |
| MS RECEIVED SIGNAL STRENGTH | $MS_{RSSIBS1}$ AT T1 | | | |
| BS RECEIVED SIGNAL STRENGTH | | $BS1_{RSSI335}$: RECEIVED SIGNAL STRENGTH FROM MS 370 AT T1<br><br>$BS1_{RSSI365}$: RECEIVED SIGNAL STRENGTH FROM MS 380<br><br>$BS1_{RSSI375}$: RECEIVED SIGNAL STRENGTH FROM MS 390 | $BS2_{RSSI305}$: RECEIVED SIGNAL STRENGTH FROM MS 370 AT T1 | $BS3_{RSSI315}$: RECEIVED SIGNAL STRENGTH FROM MS 370 AT T1 |
| BS TRANSMITTED OUTPUT POWER | | $BS1_{POWER}$ | $BS2_{POWER}$: ANTICIPATED POWER TO BE USED BY BS2 | $BS3_{POWER}$: ANTICIPATED POWER TO BE USED BY BS3 |

FIG. 5

| | BS1 | BS2 | BS3 |
|---|---|---|---|
| PATHLOSS BETWEEN MS AND BS | $PL_{335} = MS_{TransBS1} - BS1_{RSSI335}$ | $PL_{305} = MS_{TransBS1} - BS2_{RSSI305}$ | $PL_{315} = MS_{TransBS1} - BS3_{RSSI315}$ |
| ESTIMATED SHORT TERM C/I DOWNLINK | $\dfrac{MS_{RSSIBS1}}{BS2_{POWER} - PL_{305} + BS3_{POWER} - PL_{315}}$ | | |
| ESTIMATED SHORT TERM INTERFERENCE LEVEL UPLINK | $MS_{TransBS2} - PL_{365} + MS_{TransBS3} - PL_{375}$ | | |
| ESTIMATED LONG TERM AVERAGE C/I DOWNLINK FOR MS CONNECTED TO BS1 350 | AVERAGE OF: $\dfrac{BS1_{POWER} - PL_{335}}{BS2_{POWER} - PL_{305} + BS3_{POWER} - PL_{315}}$ | | |
| ESTIMATED LONG TERM AVERAGE C/I UPLINK FOR MS CONNECTED TO BS1 350 | AVERAGE OF: $\dfrac{BS1_{RSSI335}}{MS_{TransBS2} - PL_{365} + MS_{TransBS3} - PL_{375}}$ | | |

|   | A | B | C | D | E | F | G |
|---|---|---|---|---|---|---|---|
| A | X | A-B | A-C | A-D | A-E | A-F | A-G |
| B | B-A | X | B-C | B-D | B-E | B-F | B-G |
| C | C-A | C-B | X | C-D | C-E | C-F | C-G |
| D | D-A | D-B | D-C | X | D-E | D-F | D-G |
| E | E-A | E-B | E-C | E-D | X | E-F | E-G |
| F | F-A | F-B | F-C | F-D | F-E | X | F-G |
| G | G-A | G-B | G-C | G-D | G-E | G-F | X |

*FIG. 6*

| BS1 350 | BS2 340 | BS3 360 |
|---|---|---|
| 1 | 5 | 1 |
| 2 | 6 | 5 |
| 3 | 7 | 11 |
| 4 | 8 | 12 |
| 5 | 9 | 13 |
| 6 | 10 | 14 |

*FIG. 7A*

| BS1 350 | BS2 340 | BS3 360 |
|---|---|---|
| 1 | 5 | 1 |
| 2 | 6 | 5 |
| 3 | 7 | 11 |
| 4 | 8 | 12 |
| 6 | 9 | 13 |
| 11 | 10 | 14 |

CHANNEL ALLOCATION USING ENHANCED PATHLOSS ESTIMATES

BACKGROUND

The present invention relates to radio communication systems, and more specifically, to frequency and/or channel selection using enhanced pathloss estimates.

Radio communication systems and cellular radio communication systems are typically allocated a specific band of frequencies to operate within, usually by a governmental body. Accordingly, operators of these communication systems desire to maximize the number of users who can communicate within the allocated bandwidth. A conventional method of maximizing system capacity is through frequency reuse. Frequency reuse is a technique whereby groups of frequencies are allocated for use in regions of limited geographic coverage known as cells. Cells containing the same or similar groups of frequencies are geographically separated to allow callers in different cells to simultaneously use the same frequency without interfering with each other. By so doing many thousands of subscribers may be served by a system of only several hundred frequencies.

Figure 1:
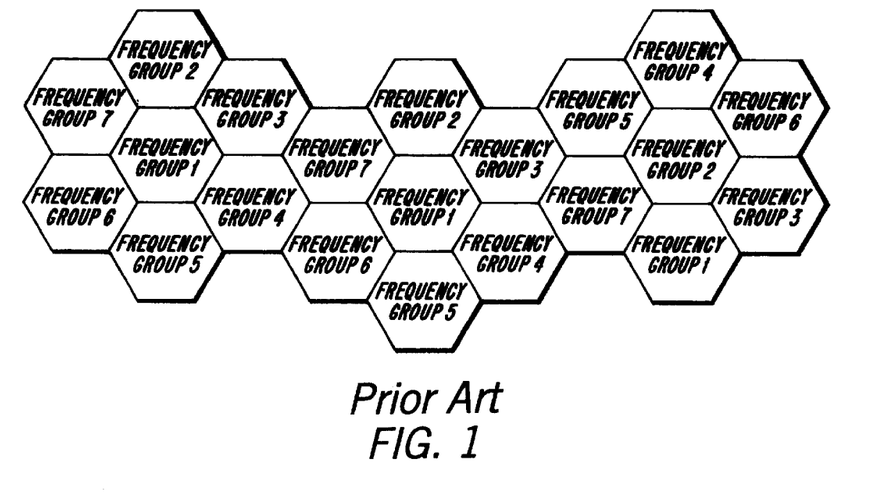
FIG. 1 illustrates a frequency reuse pattern as employed in a fixed plan cellular system.

Link quality is the benchmark of any radiocommunication system. To provide high quality voice communication the desired signal in a cellular system must maintain a minimum signal strength above all other interference. The ratio of the desired signal to the interference is known as the carrier to interference (C/I) ratio. Aside from noise, which is omnipresent, there are fundamentally two other types of interference with which a designer must contend. The first of these is interference arising from users simultaneously operating on the same channel. This is known as co-channel interference. The second source of interference is from users operating on adjacent channels. This is known as adjacent-channel interference. Adjacent channel interference is controlled by selecting the frequencies in a given cell to be separated by large frequency increments, e.g., in a typical GSM system a separation of 200 kHz between adjacent channels is used for frequencies allocated to one cell in a cell plan using three sector sites, and by using a sharp cutoff in the channel filters in order to obtain a high-adjacent channel suppression. Co-channel interference is reduced by use of a frequency reuse pattern which geographically separates cells with the same frequency group. An example of an ideal seven cell frequency reuse pattern is shown in FIG. 1.

Frequency planning is the process by which individual channels are assigned to cells within the network. Currently, most frequency planning is done a priori, i.e., a fixed frequency plan is "hard-wired" in place by each cellular system operator.

This is known as fixed channel allocation or FCA. However, as interference and traffic load are time varying, FCA is not optimal. For example, consider FIG. 2 which illustrates a highway which bisects a plurality of cellular boundaries. Since the highway may have significant automobile traffic in the morning and very little in the afternoon, the cellular traffic may significantly differ depending on location and time of day. As a result, most fixed frequency plans are not very efficient; many channels in a fixed frequency plan will have a much better link quality than is necessary to achieve high quality voice communication while many others in the same system will suffer from poor link quality which might force them to be dropped or blocked. A capacity increase could be obtained by some form of channel allocation which attempts to make the quality of all of the links equal, such as an adaptive channel allocation (ACA) scheme.

An important consideration in frequency allocation and cell planning is pathloss. Pathloss is a measure of the difference between the transmitted and received signal strengths. Various factors contribute to pathloss between the sending and receiving stations including the terrain, i.e., hills, trees, mountains, buildings. The greater the pathloss between the sending and receiving stations, the higher the transmitter power has to be in order for the receiving station to receive a signal of acceptable quality. Conventional systems for estimating pathloss for frequency planning purposes use propagation models to estimate the pathloss. The propagation models use information from terrain maps, actual site placements and antenna heights to estimate what the pathloss will be in the system. Based upon the estimated pathloss, which may or may not correlate to the actual pathloss in the system, the system determines the average disturbance in the cells and how much the different cells contribute to the disturbance level. The use of propagation models has serious drawbacks due to the fact that the models do not include the combined effects of the actual distribution of traffic and the actual radio propagation conditions.

Another solution for channel allocation is described in U.S. Pat. No. 5,491,837 to Haartsen, the disclosure of which is incorporated here by reference. In Haartsen, mobile stations are instructed to make received signal strength (RSSI) measurements of individual pilot signals transmitted from surrounding base stations. The RSSI measurements are used to estimate the pathloss between the base station whose signal was measured and the mobile station performing the measurements. However, the system of Haartsen has several limitations. The first limitation is that the RSSI measurements include signal energy associated with different types of interference, i.e., co-channel interference, adjacent channel interference, and interference from non-cellular emission (both licensed and unlicensed). Also, since the source of the interference is not known, the allocation of a new frequency may eliminate one type of interference, but the allocation may cause interference with other frequencies allotted to other users in other cells, which had good link quality prior to the new frequency allocation. Further, since Haartsen relies upon the detectors in mobile stations for measurements, and the quality of the detectors vary from one mobile station to the next, the measurements are susceptible to errors due to the different detectors.

SUMMARY

The present invention relates to a method and system for frequency and/or channel allocation using enhanced pathloss estimates. According to exemplary embodiments of the present invention, available channels (e.g., frequency and time slot for a TDMA system, frequency, channelization codes and scrambling codes for a CDMA system) are allocated to a base station in order to serve a mobile station with the best compromise between the connection quality and the disturbance this connection will cause to other connections if a particular channel is used. Further, the channels are chosen based on the actual current usage of channels, power levels in cells and measured pathloss values between cells and mobile stations. Exemplary embodiments of the invention also provide estimates of the actual disturbance for both the uplink and downlink between a mobile station in one cell and base stations in other cells. Using the enhanced pathloss estimates the system also provides estimates of the impact due to changes in power level, changes in the amount of traffic and changes in the distribution of mobiles. Further, the system provides estimates of the effects of frequency replanning without causing disturbance to the system.

Through the use of the measurements provided by exemplary embodiments of the present invention, it is possible to optimize the frequency plan for a whole cellular communication system before the frequency plan is placed into operation. Exemplary embodiments of the present invention also use the measurements to optimize the frequency plan due to different traffic situations during a day, e.g., two frequency plans for an area one for high traffic and one for low traffic. In addition, the system uses the pathloss estimates in the determination of neighboring cells for handover execution, handover evaluation, and cell reselection.

BRIEF DESCRIPTION OF THE DRAWINGS

The present invention will now be described with reference to the accompanying drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 2:
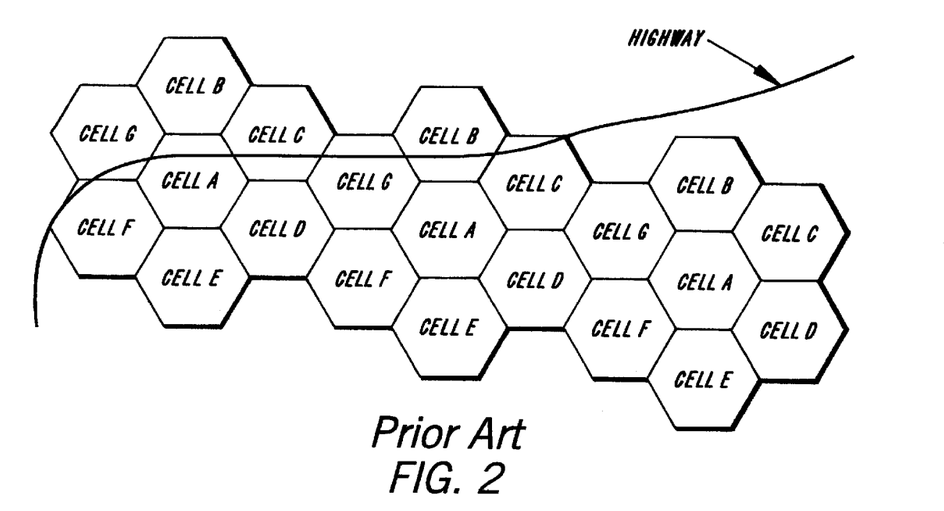
FIG. 2 is an exemplary illustration of the time dependent characteristics of cellular system loading.
Figure 3:
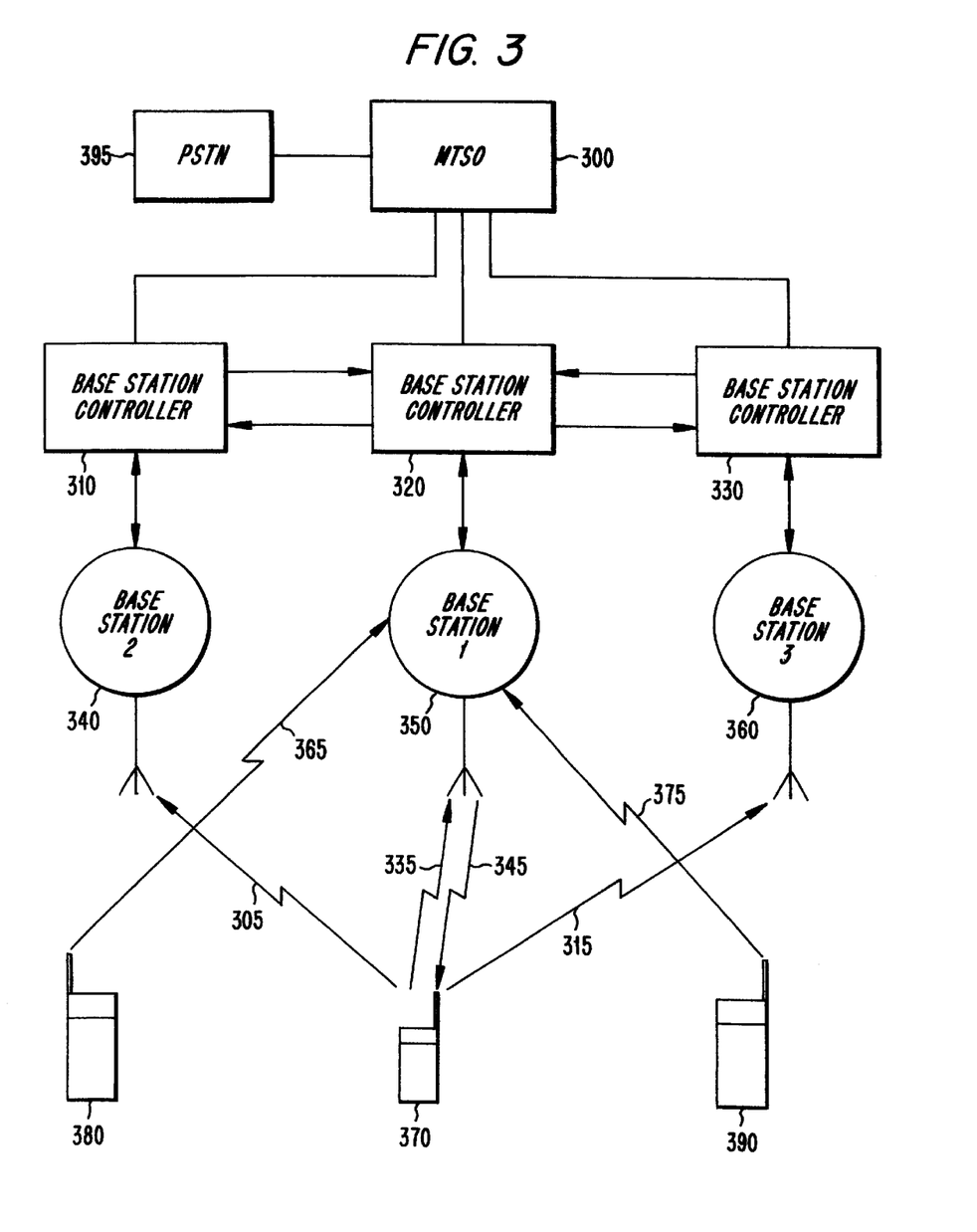
FIG. 3 illustrates the acquisition of signal measurements according to an exemplary embodiment of the present invention.

FIG. 3 illustrates the acquisition of signal measurements according to an exemplary embodiment of the present invention. The operation of the system according to the present invention is controlled by the mobile telephone switching office (MTSO) 300. The MTSO 300 is connected, either directly or indirectly, to each of the base station controllers 310, 320 and 330. According to an exemplary embodiment of the present invention, mobile station 370 has a call routed through base station 1 (BS1) 350. Accordingly, downlink signal 345 is transmitting information to mobile station 370, and mobile station 370 is transmitting information to BS1 350 via uplink signal 335. Although FIG. 3 illustrates three uplink signals transmitted from mobile station 370 (305, 315 and 335) between the mobile station 370 and the various base stations, one skilled in the art will recognize that the uplink signal from mobile station 370 actually disperses in various directions from the mobile station through the air so that the use of different reference numerals for each different "signal" illustrates the reception of the same uplink signal by the various, geographically dispersed, base stations. Additionally, although the base stations in FIG. 3 appear to be geographically close together, the cells which correspond to the base stations need not actually be adjoining cells. Accordingly, BS1 350 may be located in cell G of FIG. 2, while BS2 340 and BS3 360 may be located in cells C and E, respectively.

While mobile station 370 is carrying on the call, MTSO 300 determines whether base station 2 (BS2) 340 is currently transmitting or receiving on the same channel as that which mobile station 370 is using for transmitting and receiving information with BS1 350. If BS2 340 is not currently transmitting or receiving on the same channel, then MTSO 300 instructs mobile station 370 to lock the transmission power level at its current level. In some systems power locking can be achieved by instructing BS1 350 not to transmit any power control commands which adjust mobile station 370's output power. In other systems, e.g., wherein the mobile station can independently adjust its transmit power, it may be necessary to send an explicit power locking command. Locking the transmission power will lead to a more accurate measurement than a measurement on a mobile station whose transmission power is not locked. However, if the transmission power is locked for a long period of time, unwanted signal degradation may result on the mobile station to base station connection. Accordingly, although it is preferred to lock the transmission power during measurement, the power locking procedure may be omitted if the locking time is long enough to cause unwanted signal degradation.

Once mobile station 370's transmission power has been locked, MTSO 300 instructs BS2 340 to identify and measure uplink transmission 305 of mobile station 370. According to a conventional time-division multiple access (TDMA) scheme, mobile station 370's transmission can be identified by, for example, the frequency, the time slot(s) color code and the syncword, associated with its uplink transmission. Since this exemplary embodiment deals with a TDMA transmission scheme, mobile station 370 will not normally be transmitting in all of the time slots. Accordingly, BS2 340 will be instructed to measure signal 305 only when mobile station 370 is transmitting. Therefore, BS2 340 will identify the uplink transmission of mobile station 370 using information such as the color code and the syncword which is associated with mobile station 370.

According to a purely exemplary embodiment, BS2 340 could be restricted from measuring unless mobile station 370 is transmitting at a high power in order to avoid synchronization errors. If synchronization fails, a predefined low value for the received signal strength at BS2 340 can be used, since failing to synchronize is an indication that the signal strength from the mobile station 370 is small. Assuming that the synchronization failure is not due to disturbance from other mobile stations in surrounding cells using the same frequency, the small signal strength indicates that mobile station 370 will not likely cause disturbance to BS2 340.

Once BS2 340 has identified the signal transmitted from mobile station 370, BS2 340 measures the strength of signal 305 received from mobile station 370 at time $T_1$. BS2 340 records the signal strength measurement and transmits the information to MTSO 300. Also occurring at time $T_1$, the MTSO 300 instructs BS3 360 to identify and synchronize to the uplink signal 315 of mobile station 370 and to take a signal strength measurement. It is important to note that it is not essential for BS3 360 to measure at the same time, $T_1$, as BS2 340 and that such synchronous measurements are made merely because the mobile station's power level is locked during time $T_1$. However, the measurements from BS2 340 should occur at the same time as the measurements of BS1 350. Similarly, the measurements from BS3 360 should be made during the same time as the measurements of BS1 350. Also during time $T_1$, mobile station 370 transmits to BS1 350, the power level at which the mobile station 370 is currently transmitting and the current received power level of signal 345. If the power level of the mobile station 370 is controlled by BS1 350, then BS1 350 will know the power level used by mobile station 370 and there will be no need for the mobile station to send its currently used power level to BS1 350. Finally, BS1 350 reports the power level at which mobile station 370 is currently transmitting and the carrier level of downlink signal 345 which BS1 350 is currently transmitting and the current received signal strength of uplink signal 335. The MTSO 300 collects all the measurements for time $T_1$, and calculates pathloss estimates.

Figure 4:
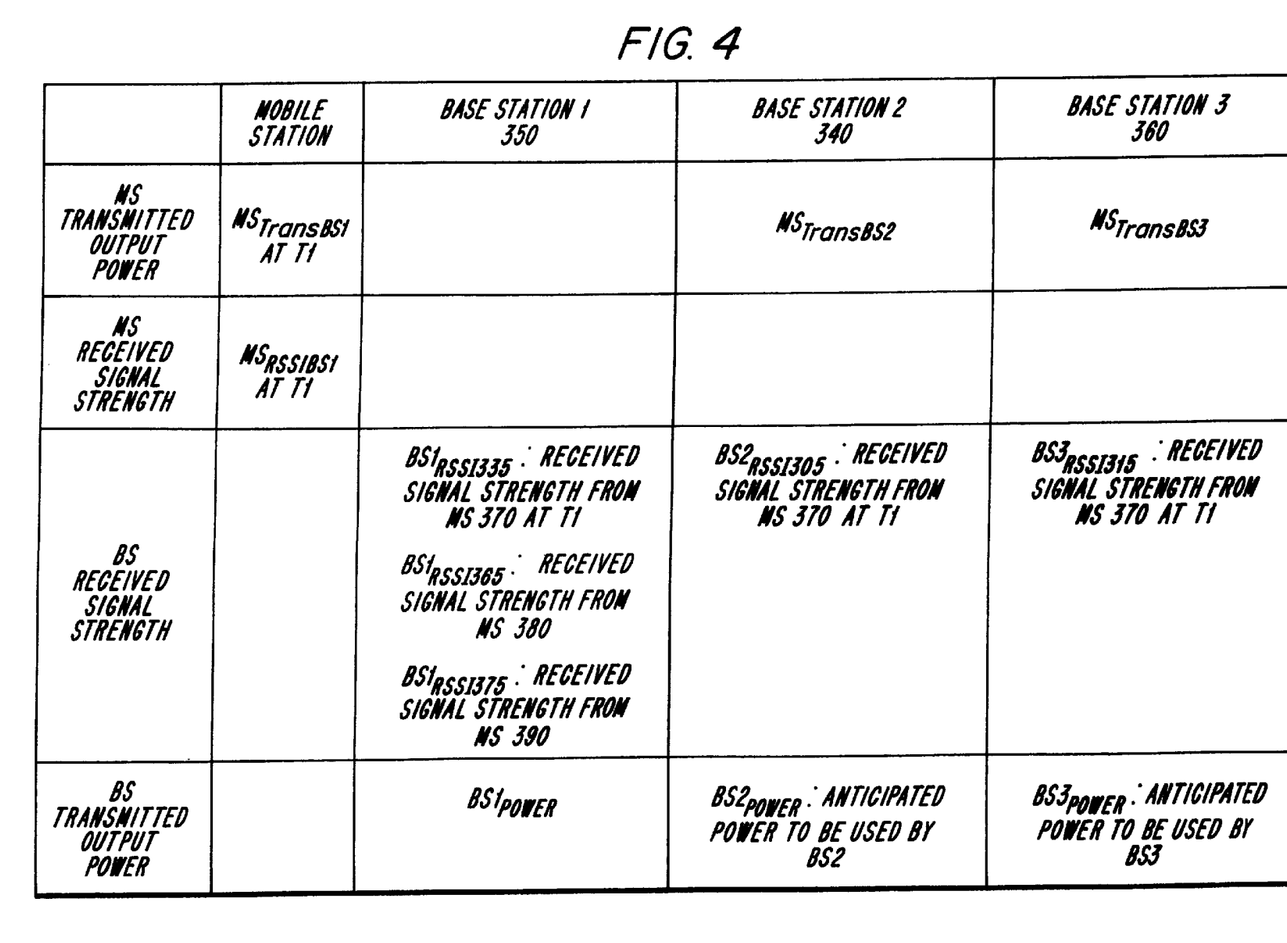
FIG. 4 is a table which illustrates an exemplary matrix of system measurements.

FIG. 4 illustrates an exemplary matrix which the MTSO 300 builds using the afore described measurements. The first column illustrates the measurements reported to the MTSO 300 by mobile station 370. Accordingly, mobile station 370 reports the locked transmitted output power at time $T_1$, $MS_{TransBS1}$, and the received signal strength from BS1 350 at time $T_1$, $MS_{RSSIBS1}$.

The second column of the table in FIG. 4 represents the measurements reported to MTSO 300 from BS1 350. BS1 350 reports a measurement of the received signal strength from mobile station 370 at time $T_1$, which is represented by $BS1_{RSSI335}$. BS1 350 also reports the received signal strength from mobile station 380 and from mobile station 390, which are represented by $BS1_{RSSI365}$ and $BS1_{RSSI375}$, respectively. In addition, BS1 350 reports the power level used in its transmission to mobile station 370, $BS1_{power}$.

The third column of the table in FIG. 4 represents measurements reported to MTSO 300 from BS2 340. The first row of the third column contains the transmitted power from mobile station 380, which is represented by $MS_{TransBS2}$. The third row of the third column represents the received signal strength of signal 305 from mobile station 370 at time $T_1$, and is represented by $BS2_{RSSI305}$. The fourth row of the third column contains the anticipated amount of power used by BS2 340, and is represented by $BS2_{power}$.

The fourth column of the table in FIG. 4 represents measurements reported to MTSO 300 from BS3 360. The first row of the third column contains the transmitted power from mobile station 390, which is represented by $MS_{TransBS3}$. The third row of the fourth column represents the received signal strength of signal 315 from mobile station 370 at time $T_1$ and is represented by $BS2_{RSSI315}$. The fourth row of the fourth column contains the anticipated amount of power used by BS3 360, and is represented by $BS3_{power}$.

Figure 5:
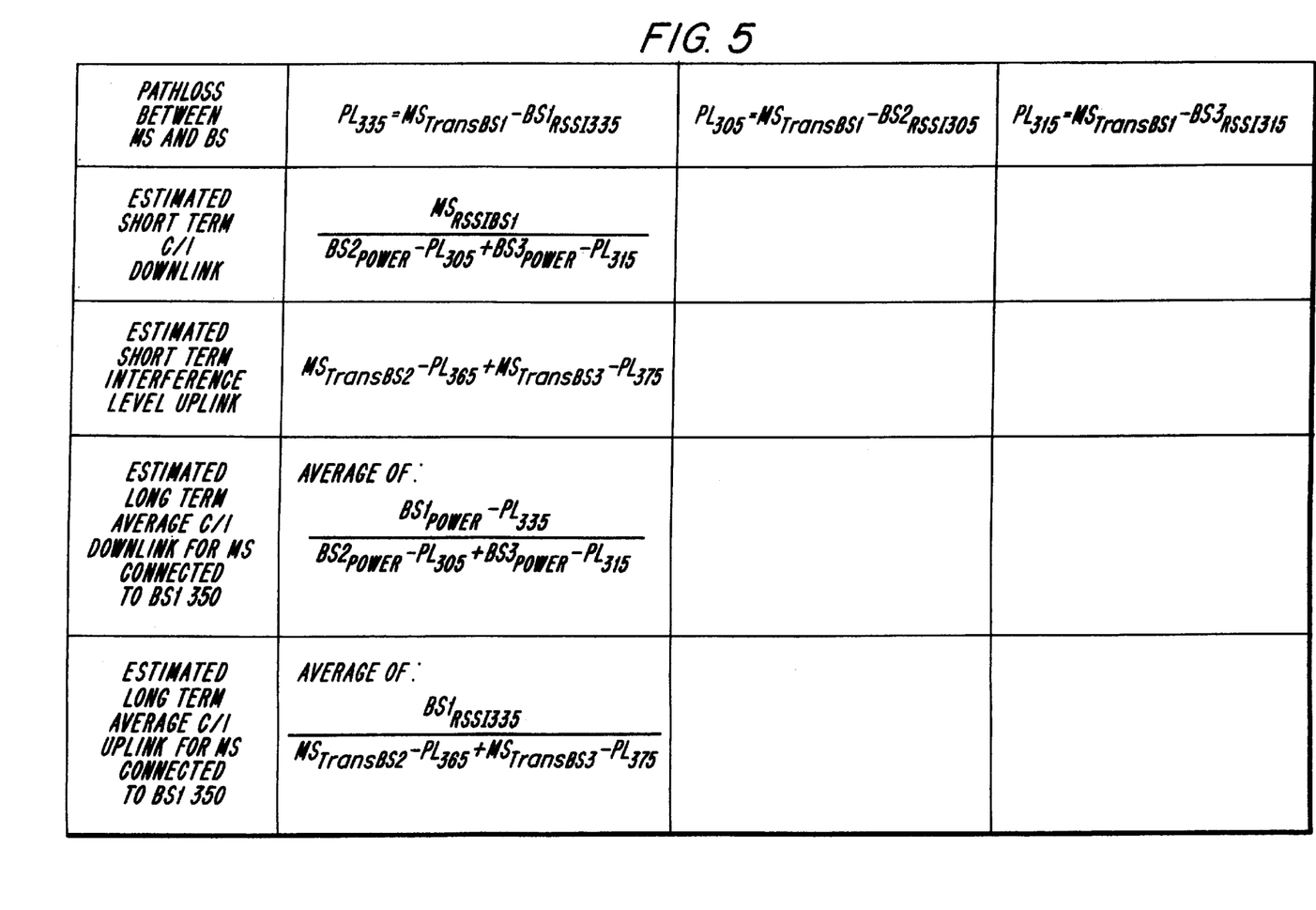
FIG. 5 is a table which illustrates an exemplary matrix of system calculations based upon system measurements.

FIG. 5 illustrates an exemplary table of calculations built by MTSO 300 using the reported measurements of FIG. 4. Accordingly, pathloss for the uplink signal 335, $PL_{335}$, from mobile station 370 to BS1 350 is calculated by subtracting the power level received by BS1 350 from mobile station 370, $BS1_{RSSI335}$, from the power level at which mobile station 370 is currently transmitting, $MS_{TransBS1}$. The MTSO 300 also calculates the pathloss between the mobile station 370 and BS2 340 by subtracting the signal strength received by BS2 340 from mobile station 370, $BS2_{RSSI305}$, from the mobile station's 370 output power, $MS_{TransBS1}$. Similarly, for BS3 360, the MTSO 300 also calculates the pathloss between the mobile station 370 and BS3 360 by subtracting the signal strength received by BS3 360 from mobile station 370, $BS3_{RSSI315}$, from the mobile station's 370 output power, $MS_{TransBS1}$.

In order to estimate the short term C/I for BS1 350's downlink, the MTSO 300 calculates the difference between the anticipated power from BS2 340 and the pathloss to BS2 340, the difference between the anticipated power from BS3 360 and the pathloss to BS3 360, and sums them together, i.e., $(BS2_{power}-PL_{305}) + (BS3_{power}-PL_{315})$. The MTSO 300 then divides the signal strength received by mobile station 370 from BS1 350, i.e., $MS_{RSSIBS1}$ by the aforementioned sum, as illustrated by the equation in the second row of the first column in FIG. 5.

In order to determine the estimated short term interference level in the uplink connection, MTSO 300 takes the difference between the transmitted power from the mobile stations in cells corresponding to BS2 340 and BS3 360, and the respective pathloss between the mobile stations and BS1 350, i.e., $MS_{TransBS2}-PL_{365}$ and $MS_{TransBS3}-PL_{375}$. MTSO 300 then adds the uplink interference measurements to calculate the estimated short term interference level in the uplink, i.e., $(MS_{TransBS2}-PL_{365})+(MS_{TransBS3}-PL_{375})$.

The estimated long term average C/I in the downlink for mobile stations connected to BS1 350 is illustrated in the fourth row of the first column in FIG. 5. MTSO 300 calculates the difference between the anticipated power used by base stations surrounding BS1 350 and their respective pathloss, $BS2_{power}-PL_{305}$ and $BS3_{power}-PL_{315}$. The aforementioned differences are then summed to arrive at the interference level in the downlink to the cell associated with BS1 350. MTSO 300 also calculates the carrier power by taking the difference between BS1 350's transmitted output power and the pathloss to mobile station 370, i.e., $BS1_{power}-PL_{335}$. Then the carrier measurement for the downlink is divided by the interference measurement for the downlink. MTSO 300 continues to make the C/I calculation over a period of time and calculates an average of the C/I calculations to achieve a long term estimation of the C/I in the downlink.

The estimated long term average C/I in the uplink between mobile station 370 and BS1 350 is illustrated in the last row of the first column in FIG. 5. MTSO 300 takes the difference between the transmitted power from the mobile station in cells corresponding to BS2 340 and BS3 360, and the respective pathloss between the mobile stations and BS1 350, i.e., $MS_{TransBS2}-PL_{365}$ and $MS_{TransBS3}-PL_{375}$. MTSO 300 then adds the uplink interference measurements to calculate the estimated interference level in the uplink, i.e., $(MS_{TransBS2}-PL_{365}) + (MS_{TransBS3}-PL_{375})$. The carrier level from mobile station 370 is divided by the estimated interference level to determine the C/I level. MTSO 300 continues to make the C/I calculation over a period of time a calculates an average of the C/I calculations to achieve a long term estimation of the C/I level in the uplink.

According to an exemplary embodiment, MTSO 300 issues measurement standing orders instructing the system to measure the typical pathloss between two cells at a prescribed hour of the day. The MTSO 300 collects the measurements and calculations of FIGS. 4 and 5, over a period of time in order to produce a statistical view of the pathloss between two cells during the prescribed hours of the day. These calculations over time can be used, as described below, to adaptively adjust the frequency plan for the cellular system. It is important to note that the pathloss estimates are coordinated to be performed at the same time for wanted signal and for the disturbed signal, e.g., samples of $PL_{305}$ and $PL_{335}$ are taken at the same time as the signal strength of signal 345 and the value for $MS_{TransBS1}$. By making these synchronized measurements, the system can determine the average pathloss for the wanted signal, e.g., signal 345, towards a mobile station when having a certain average pathloss between different disturbing base stations and mobile stations. Further, the system can determine the average pathloss between the mobile station and different surrounding base stations when the mobile station is using a certain power level.

Figure 6:
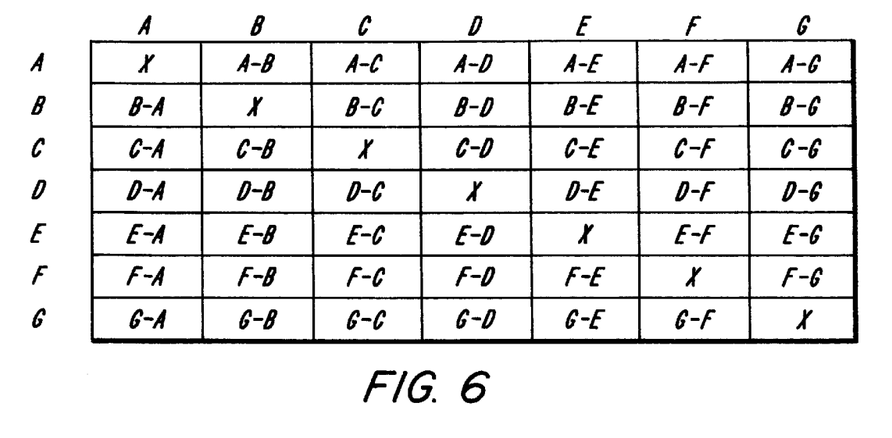
FIG. 6 is a table which illustrates another exemplary matrix used by a system operator to determine frequency allocation.

Using the pathloss values for all of the cells towards the other cells the MTSO 300 can determine how much a particular cell will interfere with other cells based upon frequencies allotted to the various cells. For example, FIG. 6 illustrates an exemplary matrix built by MTSO 300 which indicates the amount of pathloss between seven base stations (BS1, BS2, BS3, BS4, BS5, BS6, BS7) located in seven different cells (A, B, C, D, E, F, G), respectively, the cells are arranged as shown in FIG. 2. Accordingly, if the pathloss from cell A to cell B, i.e., first row, second column of the table in FIG. 6, is great enough, the MTSO 300 may allocate the same frequency to both cell A and cell B, with minimal co-channel interference from the transmissions in cell A to the transmission in cell B. Conversely, if the pathloss between cell A and cell B is very small, the system operator may determine that the adjacent channel interference, i.e., a transmission in cell A at a first frequency and a transmission in cell B on a second frequency adjacent to the first frequency, would result in unacceptable voice quality for the adjacent channel transmission. Since the average estimated pathloss from a base station located in cell A towards mobile stations in cell B is calculated separately from the average estimated pathloss from mobile stations located in cell A towards base stations in cell B, a cellular system operator would need two pathloss tables, i.e., one for uplink pathloss and one for downlink pathloss, similar to the table in FIG. 6, in order to effectively allocate frequencies to the cells and adjust transmission power levels of both the base station and the mobile station. Since the duplex distance between the uplink and downlink frequency of a connection is fixed, the system should consider the uplink and the downlink pathloss tables in conjunction with each other when allocating an uplink and downlink frequency pair to a base station.

Since the pathlosses between all of the surrounding cells are known, i.e., they have been calculated as described above, the system can determine whether the allocation of a certain frequency to one cell, in order to avoid interference with a second cell, will cause interference with a third cell, without having to implement the frequency change in the system. For instance, if the system determines that a certain transmission from cell A is interfering with a transmission from cell B, the system will allocate a new frequency for cell A, based upon the aforementioned C/I ratio, that will result in an acceptable amount of interference to cell B. Further, the system can calculate, prior to implementation of the new frequency and based upon the calculated pathloss values, whether the newly allocated frequency in cell A will cause unacceptable interference with any of the other surrounding cells, i.e., cells C–G.

Figure 7A:
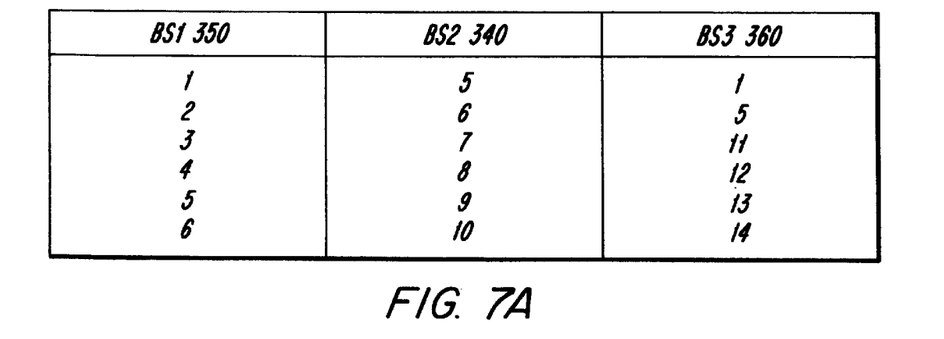
FIGS. 7A and 7B illustrate exemplary channel assignments based on the system calculations.
Figure 7B:
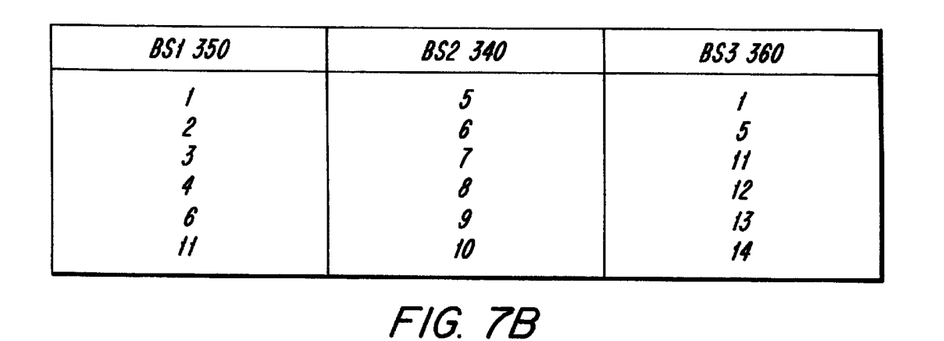

FIGS. 7A and 7B illustrate exemplary channel group assignments before and after channel reassignment. The channel assignments in FIG. 7A shows that BS1 350 has co-channel transmissions on channels 5 and 6 with BS2 340 and on channels 1 and 5 with BS3 360. If, after the system has made the afore described measurements and calculations, it is determined that channel 5 in BS1 350 has too much co-channel interference, the system will use a matrix similar to the matrix illustrated in FIG. 6 to determine another channel which would not result in unacceptable interference. Accordingly, the system may determine that even though BS3 360 is transmitting on channel 11, that BS3 360's co-channel interference would not result in an unacceptable amount of interference to BS1 350. Therefore, the system can determine prior to assignment of the channel, whether the channel will have an acceptable C/I level.

The present invention can also be used for transmission power level determination using the pathloss values and the C/I ratios in order to determine the interference that can be caused by using such power levels. For instance, the system may determine that the use of a certain frequency between a mobile station and a base station results in unacceptable link quality. However, the system can determine whether, by increasing the power level of the carrier signal, the link quality will improve. Further, the system can determine, prior to implementation of the new power level in the cellular system, whether this new power level will cause an unacceptable amount of interference between transmissions in surrounding cells. The system can also determine if the power levels used in a first cell are decreased, whether the first cell will cause less interference towards a second cell if the decreased power level is implemented.

Figure 8:
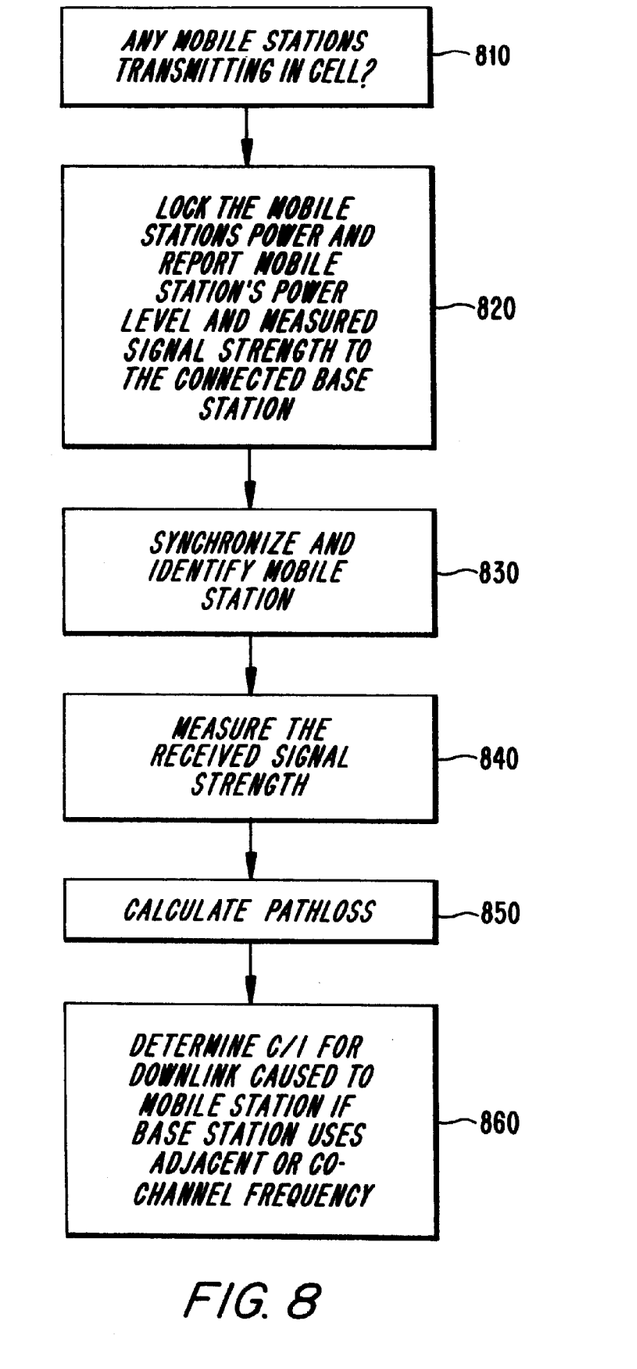
FIG. 8 illustrates an exemplary method in a TDMA system according to the present invention.

FIG. 8 illustrates an exemplary method according to the present invention. Accordingly, in step 810 the system determines whether there are any mobile stations transmitting in the cell of interest, e.g., the cell containing BS1 350. If there is a mobile station transmitting, the system orders the mobile station to lock its transmission power and report its power level and the measured signal strength received from the base station, to the system in step 820. As mentioned earlier, if the amount of time that the transmission power is locked is long enough to cause unwanted quality degradation, step 820 may be omitted. In addition, at the same time, the base station connected to the mobile station begins to collect measurement results of the received signal strength from the mobile station. In step 830, the surrounding base stations synchronize and identify the mobile station's transmission using afore described information. In step 840, the base station's received signal strength is measured and reported to the system. The system calculates the pathloss in step 850. In step 860, the current pathloss is used by the system to estimate the current C/I downlink caused to a mobile station if a base station would allocate an adjacent or co-channel for a mobile station's transmission. It is noted that for non-realtime channel planning purposes the accumulated average estimated pathloss values should be used to estimate downlink and uplink average C/I levels. In addition, the short term estimate for C/I level change caused to a connection if the frequency is turned on in a disturbing base station.

Although the exemplary embodiment described above uses a TDMA system and allocates frequencies, one skilled in the art will recognize that the system is equally applicable to CDMA systems and the allocation of codes. For instance, in a CDMA system, the base stations can identify a mobile station's transmission by the codes or combination of codes, e.g., a channelization code and a scrambling code, used to spread the data signal. In addition, since some CDMA systems use multiple frequency bands (e.g., WCDMA uses distinct 5 MHZ bands from a 60 MHZ spectrum) the identification of a mobile station's transmission may also require the identification of the particular frequency band used by the mobile station. Further, since CDMA systems overlap many transmissions on the same frequency band, systems according to the present invention can be used to determine whether the allocation of the same code, e.g., a scrambling code, to one or more surrounding base stations would cause an unacceptable level of interference.

In a CDMA system the mobile station will typically measure on the common control channel or pilot channels broadcasted from the base station. The common control channels typically use a fixed high power. Through the use of the downlink scrambling code, the mobile station can also be certain that it is measuring the correct base station since the different base stations in an area will use different scrambling codes. Accordingly, the mobile station is able to provide the system with the enhanced pathloss estimates, i.e., the source for the signal strength measurement can be identified by detecting the scrambling code. Some CDMA systems vary the power levels of a mobile station's transmissions frequently, which renders the locking of the transmission power in these CDMA systems impossible. Therefore the procedure for making improved pathloss estimates in CDMA systems should be able to operate without locking the mobile station's transmission power.

Figure 9:
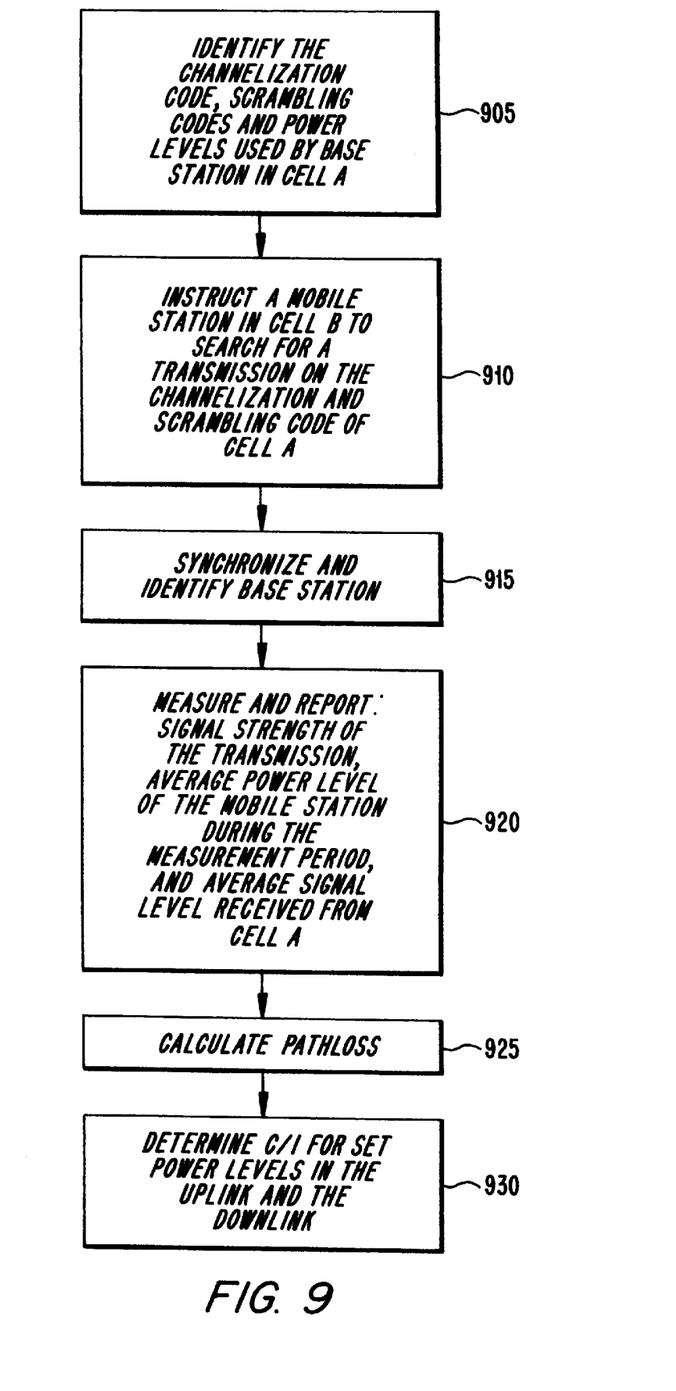
FIG. 9 illustrates an exemplary method in a CDMA system according to the present invention.

FIG. 9 illustrates an exemplary implementation of the invention in a CDMA system. The channelization code, scrambling code and power level used by the base station in cell A are identified in step 905. In step 910, the mobile station in cell B is instructed to search for a transmission which is using a specific channelization and scrambling code. The mobile station synchronizes and identifies the base station in step 915. After the mobile station has synchronized to the transmission, the mobile station measures and reports the signal strength of the transmission, the average power level used during the measurement period, and the average signal level received from cell A, in step 920. In step 925 the pathloss between cell A and cell B is calculated either in the mobile station if the mobile station has the information about the power levels, or in the system if the mobile station does not have the aforementioned information. In step 930, the C/I for the downlink can be calculated for various power levels used by the base station and the C/I in the uplink can be calculated for various power levels used by the mobile station.

The above described procedure can be used in CDMA systems for determination of neighboring cell lists. Neighboring cell lists are defined by a cellular system to aid in handover execution, handover evaluation and cell reselection. Accordingly, the selection of a particular cell as a neighboring cell in a mobile station's neighboring cell list using the enhanced pathloss measurements and selection techniques described above allows the system to eliminate cells from the list whose connections will likely have an undesirable carrier-to-interference ratio. For instance, low pathloss values between cells indicates that a cell should be defined as a neighboring cell, while large pathloss values indicate that a cell should not be defined as a neighboring cell. Neighboring cell selection can also be used in a TDMA system using the applicable methods described in regard to the TDMA embodiment of the present invention.

The present invention has been described by way of exemplary embodiments to which the invention is not limited. Modifications and changes will occur to those skilled in the art without departing from the spirit and scope of the invention as defined in the appended claims.

What is claimed is:

1. In a cellular communication system a method for cell planning and channel allocation comprising the steps of:
    determining a pathloss value between a mobile station located in a first cell and a base station located in a second cell;
    determining an interference value for interference caused by said base station located in said second cell to a transmission between said mobile station and a base station located in said first cell; and
    allocating a channel to a group of channels assigned to said base station located in said first cell based upon said interference determination and said pathloss value, wherein said cellular communication system uses a CDMA transmission scheme, and wherein said second cell is added to a neighboring cell list for said mobile station depending upon said pathloss value.

2. The method according to claim 1, wherein said step of determining a pathloss value includes identifying said base station by connection specific information associated with said transmission.

3. The method according to claim 2, wherein said connection specific information includes at least one of a frequency, a channelization code and a scrambling code.

4. In a cellular communication system a method for transmission power level selection for a channel assigned to a base station located in a first cell comprising the steps of:
    determining a pathloss value between a mobile station located in said first cell and a base station located in a second cell;
    determining an interference caused by said base station located in said second cell to a transmission between said mobile station and said base station located in said first cell; and
    allocating a transmission power level to said transmission between said mobile station and said base station located in said first cell based upon said interference determination and said pathloss value, wherein said cellular communication system uses a CDMA transmission scheme, and wherein said second cell is added to a neighboring cell list for said mobile station depending upon said pathloss value.

5. The method according to claim 4, wherein said step of determining a pathloss value includes identifying said base station by connection specific information associated with said transmission.

6. The method according to claim 5, wherein said connection specific information is at least one of a frequency, a channelization code and a scrambling code.

7. In a cellular communication system a method for cell planning and channel allocation comprising the steps of:
    determining a first pathloss value between a mobile station, located in a first cell and transmitting on a first channel to a first base station, and a second base station;
    determining a second pathloss value between said mobile station and a third base station;
    determining a source of interference to said transmission based on said pathloss values, said first channel, and the channels which are allocated to said second and third base stations.

8. The method according to claim 7, further comprising the step of:
    allocating a channel to said first base station based on said interference determination and said first and second pathloss values.

9. In a cellular communication system an apparatus used for cell planning and channel allocation comprising:

means for determining a pathloss value between a mobile station located in a first cell and a base station located in a second cell;

means for determining an interference value for interference caused by said base station located in said second cell to a transmission between said mobile station and a base station located in said first cell; and means for allocating a channel to a group of channels assigned to said base station located in said first cell based upon said interference determination and said pathloss value, wherein said cellular communication system uses a CDMA transmission scheme, and wherein said second cell is added to a neighboring cell list for said mobile station depending upon said pathloss value.

10. The apparatus according to claim 9, wherein said means for determining a pathloss value includes identifying said base station by connection specific information.

11. The apparatus according to claim 10, wherein said connection specific information includes at least one of a frequency, a channelization code and a scrambling code associated with said transmission.

12. In a radiocommunications system, a method for cell planning and channel allocation comprising the steps of:

identifying a base station located in a first cell by connection specific information;

instructing a mobile station in a second cell to search for and synchronize to a transmission using said connection specific information;

reporting, by said mobile station, signal strength of said transmission, average power level used by said mobile station during a measurement period, and average signal level received from said first cell; and calculating pathloss between said first cell and said second cell.

13. The method of claim 12, wherein said connection specific information includes at least one of a frequency, channelization code and a scrambling code.

* * * * *